United States Patent
Tanaka (10) Patent No.: US 11,914,748 B2
(45) Date of Patent: Feb. 27, 2024

(54) APPARATUS AND METHOD FOR COLLECTING DATA

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 480 days.

(21) Appl. No.: 17/348,843

(22) Filed: Jun. 16, 2021

(65) Prior Publication Data

US 2021/0397739 A1    Dec. 23, 2021

(30) Foreign Application Priority Data

Jun. 22, 2020   (JP) ................. 2020-107165

(51) Int. Cl.
*G06F 21/62* (2013.01)
*G06F 16/22* (2019.01)
*G06F 16/25* (2019.01)

(52) U.S. Cl.
CPC ...... *G06F 21/6245* (2013.01); *G06F 16/2255* (2019.01); *G06F 16/258* (2019.01)

(58) Field of Classification Search
None
See application file for complete search history.

(56) References Cited

U.S. PATENT DOCUMENTS

2015/0128254 A1    5/2015  Rao et al.
2016/0359628 A1*  12/2016  Singh ................. G06F 16/1744
2016/0371481 A1*  12/2016  Miyake ................. H04L 9/3228
2019/0138023 A1    5/2019  Niwa et al.
2019/0287318 A1*   9/2019  Fukuhara ............ H04L 63/0428
2020/0143680 A1*   5/2020  Max ..................... G08G 1/0141
2021/0105143 A1*   4/2021  Unagami ............. G08G 1/0112

FOREIGN PATENT DOCUMENTS

| CN | 104321776 A | 1/2015 | |
| CN | 109747538 A | 5/2019 | |
| JP | 2015-101195 A | 6/2015 | |
| JP | 2015101195 A | * 6/2015 | |
| JP | 2016-177452 A | 10/2016 | |
| JP | 2016177452 A | * 10/2016 | ........... C21D 8/0226 |
| JP | 2017-117154 A | 6/2017 | |
| JP | 2017117154 A | * 6/2017 | |
| JP | 2019161434 A | 9/2019 | |
| KR | 2020096899 A | * 8/2020 | ........... C21D 8/0226 |
| WO | 2015129352 A1 | 9/2015 | |

* cited by examiner

*Primary Examiner* — Joseph P Hirl
*Assistant Examiner* — Hassan Saadoun
(74) *Attorney, Agent, or Firm* — Dickinson Wright, PLLC (57) ABSTRACT

An apparatus for collecting data includes a memory that stores a vehicle identifier for identifying a vehicle; and a processor configured to associate, when a time of generation of data representing road environment around the vehicle is included in a first period, a first hash value with the data and to associate, when the time of generation is included in a second period different from the first period, a second hash value different from the first hash value with the data. The data is generated by a sensor mounted on the vehicle. The first hash value and the second hash value are obtained by irreversibly transforming the vehicle identifier.

7 Claims, 7 Drawing Sheets

APPARATUS AND METHOD FOR COLLECTING DATA

CROSS-REFERENCE TO RELATED APPLICATION

This application claims priority to Japanese Patent Application No. 2020-107165 filed on Jun. 22, 2020, and is incorporated herein by reference in its entirety.

FIELD

The present disclosure relates to an apparatus and a method for collecting data representing road environment around a vehicle.

BACKGROUND

An apparatus for collecting data that is obtained by a sensor mounted on a vehicle and which represents road environment around the vehicle is known. The collected data is used, for example, for updating a map.

To make better use of collected data, it is preferable that a series of pieces of data obtained from the same vehicle can be distinguished from other data. To enable distinction between it and other data, a series of pieces of data is connected with an identifier of the vehicle in some cases.

Japanese Unexamined Patent Publication No. 2019-161434 describes a data management system including a transmission terminal, a user terminal, a demander terminal, and a management terminal. The transmission terminal transmits data collected from a vehicle to a data server that encrypts the data in a decryptable manner. The demander terminal inquires of the user terminal whether decryption of the data transmitted from the data server is permitted. The management terminal transmits data for decrypting the encrypted data to the demander terminal when permission for decryption is inputted into the user terminal. The transmission terminal and the user terminal are associated with a user, and the data is encrypted on an individual user basis.

SUMMARY

Accumulation of data connected with an identifier makes it possible to guess activities of an individual possessing a vehicle corresponding to the identifier. Such stored data should be appropriately handled in terms of protection of private information.

It is an object of the present disclosure to provide an apparatus that can collect data from a vehicle so that activities of an individual possessing the vehicle cannot be guessed.

According to the present disclosure, an apparatus for collecting data includes a memory that stores a vehicle identifier for identifying a vehicle; and a processor configured to associate, when a time of generation of data representing road environment around the vehicle is included in a first period, a first hash value with the data and to associate, when the time of generation is included in a second period different from the first period, a second hash value different from the first hash value with the data. The data is generated by a sensor mounted on the vehicle. The first hash value and the second hash value are obtained by irreversibly transforming the vehicle identifier.

The data is composed of a plurality of pieces; and the processor of the apparatus according to the present disclosure is preferably further configured to associate the first hash value and the second hash value with the data, using a period including a series of times separated at predetermined intervals as the first period and a period including a series of times separated at predetermined intervals and not included in the first period as the second period, the times respectively corresponding to the pieces of data.

The processor of the apparatus according to the present disclosure is preferably further configured to associate the first hash value and the second hash value with the data in the first period and the second period, respectively, that are specified by period-defining information indicating starting times or ending times of the first period and the second period.

Regarding the apparatus according to the present disclosure, it is preferable that the period-defining information indicating starting times indicate a time when an ignition of the vehicle is turned on, and that the period-defining information indicating ending times indicate a time when the ignition is turned off.

The processor of the apparatus according to the present disclosure is preferably further configured to discard the data with a predetermined probability if the vehicle is located in a predetermined geographical area at the time of generation of the data.

Regarding the apparatus according to the present disclosure, it is preferable that the first hash value be obtained by irreversibly transforming the vehicle identifier connected with a first value, and that the second hash value be obtained by irreversibly transforming the vehicle identifier connected with a second value different from the first value.

According to the present disclosure, a method for collecting data includes storing a vehicle identifier for identifying a vehicle in a memory; and associating, when a time of generation of data representing road environment around the vehicle is included in a first period, a first hash value obtained by irreversibly transforming the vehicle identifier with the data instead of the vehicle identifier; and associating, when the time of generation is included in a second period different from the first period, a second hash value obtained by irreversibly transforming the vehicle identifier with the data instead of the vehicle identifier. The data is generated by a sensor mounted on the vehicle. The second hash value is different from the first hash value.

The apparatus according to the present disclosure can collect data from a vehicle so that activities of an individual possessing the vehicle cannot be guessed.

DESCRIPTION OF EMBODIMENTS

Hereinafter, an apparatus for collecting data will be explained in detail with reference to the accompanying drawings. The apparatus stores a vehicle identifier for identifying a vehicle and obtains data representing road environment around the vehicle. This data is generated by a sensor mounted on the vehicle. The apparatus then determines whether the time of generation of the data is included in a first period or a second period different from the first period. If it is determined that the time of generation of the obtained data is included in the first period, the apparatus associates a first hash value with the data. If it is determined that the time of generation of the obtained data is included in the second period, the apparatus associates a second hash value different from the first hash value with the data. The first and second hash values are obtained by irreversibly transforming the vehicle identifier.

Figure 1:
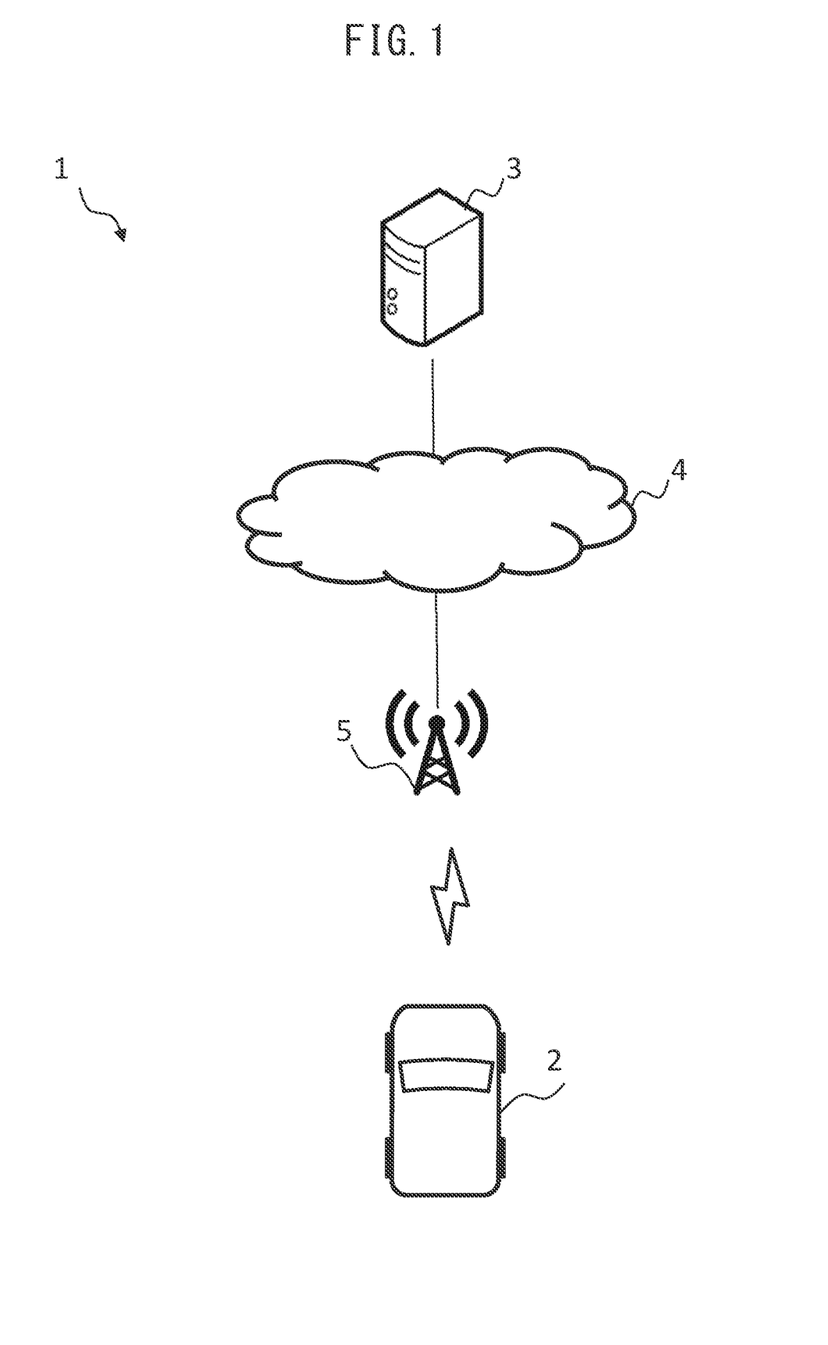
FIG. 1 schematically illustrates the configuration of a system for collecting data that includes an apparatus for collecting data.

FIG. 1 is a diagram for briefly describing a system for collecting data (hereafter, a "data collecting system"). In the present embodiment, the data collecting system 1 includes a vehicle 2 and a server 3. The vehicle 2 collects data representing road environment around the vehicle 2, and transmits it to the server 3. For example, the vehicle 2 accesses a wireless base station 5, which is connected, for example, via a gateway (not shown) to a communication network 4 connected with the server 3, thereby connecting to the server 3 via the wireless base station 5 and the communication network 4. The data collecting system 1 may include two or more vehicles 2. In the data collecting system 1, the communication network 4 may be connected with multiple wireless base stations 5.

Figure 2:
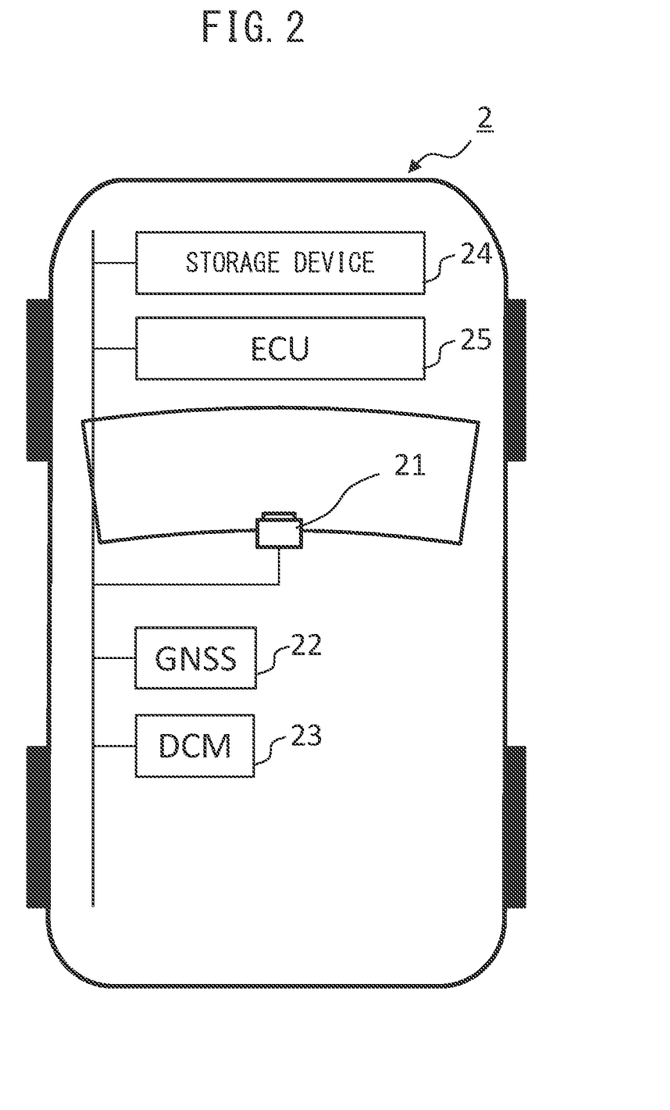
FIG. 2 schematically illustrates the configuration of a vehicle.

FIG. 2 schematically illustrates the configuration of the vehicle 2. The vehicle 2 includes a camera 21, a global navigation satellite system (GNSS) receiver 22, a data communication module (DCM) 23, a storage device 24, and an electronic control unit (ECU) 25. The ECU 25 is an example of the apparatus for collecting data. The camera 21, the GNSS receiver 22, the DCM 23, and the storage device 24 are connected to the ECU 25 so that they can communicate via an in-vehicle network conforming to a standard, such as a controller area network.

The camera 21, which is an example of a sensor mounted on the vehicle 2, includes a two-dimensional detector constructed from an array of optoelectronic transducers, such as CCD or C-MOS, having sensitivity to visible light and a focusing optical system focusing an image of a target region on the two-dimensional detector. The camera 21 is mounted, for example, in the interior of the vehicle 2 so as to be oriented to the front of the vehicle 2. The camera 21 captures a region in front of the vehicle 2 every predetermined capturing period (e.g., 1/30 to 1/10 seconds), and generates images in which this region is shown. The images obtained by the camera 21 may be color or monochrome images. The vehicle 2 may include multiple cameras taking pictures in different orientations or having different focal lengths. The camera 21 generates image data in which the time of capturing the image is embedded in a predetermined region specified, for example, by the exchangeable image file format (Exif). The time of capturing the image may be represented by the filename of the image data. The image data is an example of the data representing road environment around the vehicle.

Every time generating image data, the camera 21 outputs the generated image data to the ECU 25 via the in-vehicle network.

The GNSS receiver 22 receives a GNSS signal from a GNSS satellite every predetermined period, and determines the location of the vehicle 2, based on the received GNSS signal. The GNSS receiver 22 outputs a positioning signal indicating the result of determination of the location of the vehicle 2 based on the GNSS signal to the ECU 25 via the in-vehicle network every predetermined period.

The DCM 23, which is an example of a vehicle communication unit, is a device to execute processing for wireless communication conforming to a predetermined standard of wireless communication, such as "4G (4th Generation)" or "5G (5th Generation)." The DCM 23 accesses, for example, the wireless base station 5 to connect to the server 3 via the wireless base station 5 and the communication network 4. The DCM 23 includes data received from the ECU 25 in an uplink radio signal, and transmits the radio signal to the wireless base station 5, thereby transmitting data to the server 3. The DCM 23 may be mounted as a part of the ECU 25.

The storage device 24 includes a hard disk drive or a nonvolatile semiconductor memory. The storage device 24 temporarily stores image data obtained from the camera 21. The storage device 24 reads out image data in response to a request for doing so from the ECU 25, and passes the read-out image data to the ECU 25 via the in-vehicle network. The storage device 24 stores a character string for identifying the vehicle 2 as a vehicle identifier.

The ECU 25 obtains image data from the camera 21, and stores the image data in the storage device 24 in association with a hash value obtained by irreversibly transforming the vehicle identifier. The ECU 25 causes the DCM 23 to transmit image data with which a hash value stored in the storage device 24 is associated to the server 3 via the wireless base station 5 and the communication network 4. The ECU 25 may be mounted on the vehicle 2 as a drive recorder, which stores in the storage device 24 images showing the situation around the vehicle 2 and generated by the camera 21 during travel of the vehicle 2.

Figure 3:
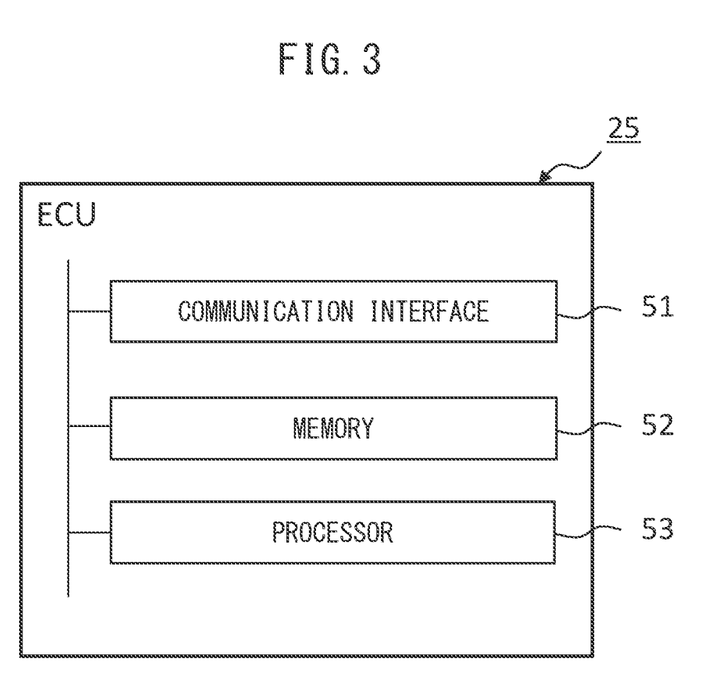
FIG. 3 schematically illustrates the hardware of an ECU.

FIG. 3 illustrates the hardware configuration of the ECU 25. The ECU 25 includes a communication interface 51, a memory 52, and a processor 53.

The communication interface 51 includes a communication interface circuit for connecting the ECU 25 to the in-vehicle network. The communication interface 51 provides received data for the processor 53, and outputs data provided from the processor 53 to an external device.

The memory 52, which is an example of a storage unit, includes volatile and nonvolatile semiconductor memories. The memory 52 stores various types of data used for processing by the processor 53, such as the vehicle identifier for identifying the vehicle 2, hash values associated with image data, values of intervals for determining whether multiple pieces of data are time-series pieces of data, geographical areas for identifying the location of the vehicle, and a probability with which data is discarded when a predetermined condition is satisfied. The memory 52 also stores various application programs, such as a data collecting program to execute a process for collecting data (hereafter, a "data collecting process").

The processor 53, which is an example of a control unit, includes one or more processors and a peripheral circuit thereof. The processor 53 may further include another operating circuit, such as a logic-arithmetic unit, an arithmetic unit, or a graphics processing unit.

Figure 4:
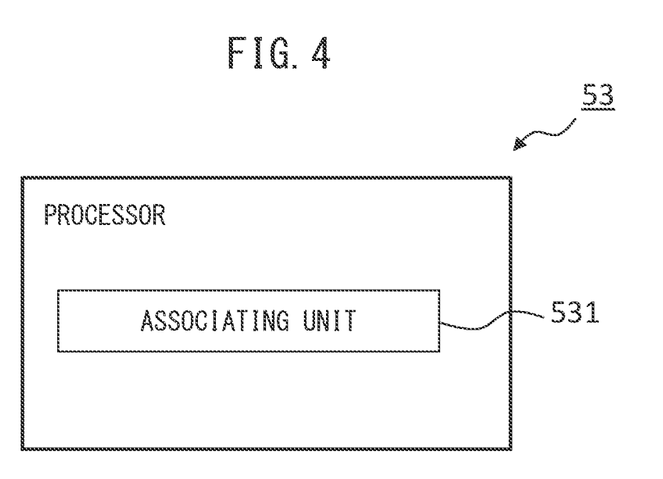
FIG. 4 is a functional block diagram of a processor included in the ECU.

FIG. 4 is a functional block diagram of the processor 53 included in the ECU 25.

The processor 53 of the ECU 25 includes an associating unit 531 as its functional block. The associating unit 531 is a functional module implemented by a program executed on the processor 53, or may be implemented in the ECU 25 as a separate integrated circuit, a microprocessor, or firmware. The processor 53 of the ECU 25 may be simply referred to as the "ECU 53" below.

The associating unit 531 obtains a vehicle identifier from the memory 52 via the communication interface 51. The associating unit 531 also obtains image data representing road environment around the vehicle 2 at a predetermined time from the camera 21 via the communication interface 51.

The associating unit 531 may further obtain period-defining information. The period-defining information is used for defining periods to associate a hash value with image data, depending on a period including the time of generation of the image data. The period-defining information indicates the starting times or the ending times of respective periods. The period-defining information indicating starting times may be obtained in response to a driver's operation for turning on the ignition to cause the power source of the vehicle 2 to be able to supply motive power. The period-defining information indicating ending times may be obtained in response to a driver's operation for turning off the ignition to cause the power source of the vehicle 2 to be unable to supply motive power. A piece of period-defining information may indicate both the ending time of a preceding period and the starting time of a period subsequent thereto. For example, the first period may be a period prior to sunrise indicated by period-defining information, and the second period may be a period subsequent thereto.

The associating unit 531 may obtain image data together with location information indicating the location of the vehicle 2 at the time of generation of the image data. In this case, when the location indicated by the location information corresponding to the obtained image data is included in a predetermined geographical area, the associating unit 531 discards the image data with a predetermined probability. Prestoring in the memory 52 a predetermined geographical area including a particular subarea in which the driver does not want his/her activities to be guessed allows for preventing the ECU 25 from obtaining image data related to such a subarea. The predetermined geographical area is set using a user interface (not shown) or may be transmitted from the server 3.

When the time of generation of the obtained image data is included in the first period, the associating unit 531 associates a first hash value with the image data. When the time of generation of the obtained image data is included in the second period different from the first period, the associating unit 531 associates a second hash value different from the first hash value with the image data. The first and second hash values are obtained by irreversibly transforming the vehicle identifier.

The associating unit 531 inputs a value obtained by connecting the vehicle identifier to a first value into a predetermined hash function, which irreversibly transforms an inputted value, to generate the first hash value. The associating unit 531 inputs a value obtained by connecting the vehicle identifier to a second value different from the first value into the predetermined hash function to generate the second hash value different from the first hash value.

The associating unit 531 may use a value corresponding to the year, month, and day of the time of generation of image data (e.g., "20200601" for image data generated on Jun. 1, 2020) as the first and second values. In this way, the associating unit 531 can regularly change hash values associated with image data. More specifically, the associating unit 531 associates the first hash value with image data generated on a date corresponding to the first value, and the second hash value with image data generated on a date corresponding to the second value, using these dates as the first and second periods, respectively.

The associating unit 531 may associate the first and second hash values with image data, using periods corresponding to series of times as the first and second periods; these times respectively correspond to pieces of image data and are separated at predetermined intervals. In this case, the first hash value is associated with a series of pieces of image data generated at predetermined intervals from a certain time, and the second hash value is associated with a series of pieces of image data generated at predetermined intervals from a time after an interruption of data generation. The predetermined interval is prestored in the memory 52. The predetermined interval is set using a user interface (not shown) or may be transmitted from the server 3.

If it obtains period-defining information together with image data, the associating unit 531 associates the first and second hash values with the image data in the first and second periods, respectively, that are specified by the period-defining information.

Figure 5:
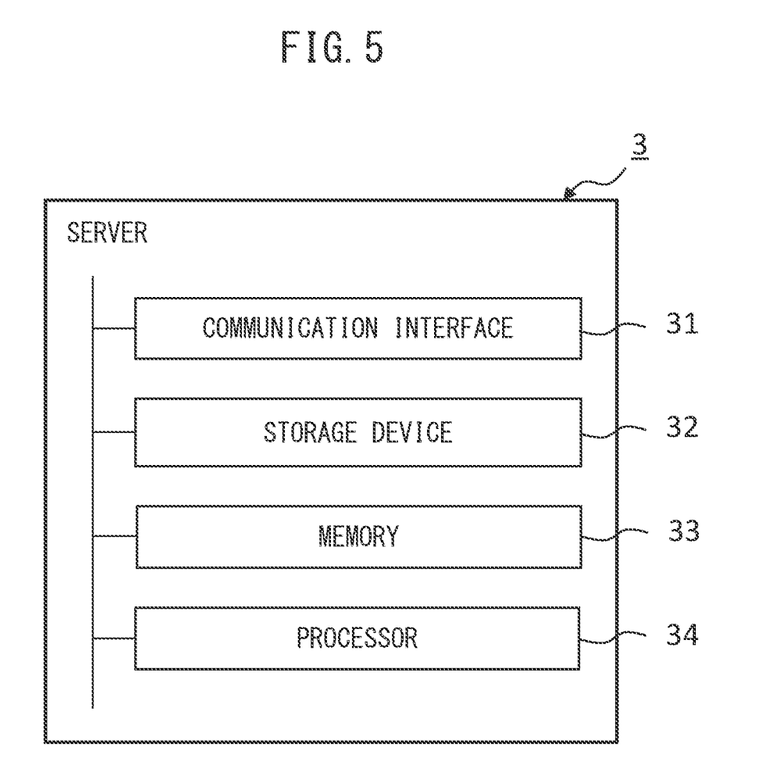
FIG. 5 illustrates the hardware configuration of a server.

FIG. 5 illustrates the hardware configuration of the server 3. The server 3 receives data from the vehicle 2 via the communication network 4, and uses the received data to execute processing. To this end, the server 3 includes a communication interface 31, a storage device 32, a memory 33, and a processor 34.

The communication interface 31, which is an example of a server communication unit, includes an interface circuit for connecting the server 3 to the communication network 4. The communication interface 31 is configured so that it can communicate with the vehicle 2 via the communication network 4 and the wireless base station 5. More specifically, the communication interface 31 passes to the processor 34, for example, image data received from the vehicle 2 via the wireless base station 5 and the communication network 4. The communication interface 31 transmits, for example, information indicating a predetermined geographical area and a predetermined interval, which is received from the processor 34, to the vehicle 2 via the communication network 4 and the wireless base station 5.

The storage device 32 includes a storage, such as a hard disk drive or a nonvolatile semiconductor memory device. The storage device 32 stores image data received from the vehicle 2 and the hash values associated therewith.

The memory 33 includes volatile and nonvolatile semiconductor memories. The memory 33 temporarily stores various types of data used for processing by the processor 34, such as image data received via the communication interface 31. The memory 33 also stores various application programs, such as an image-data receiving program to receive image data from the vehicle 2.

The processor 34 includes one or more central processing units (CPUs) and a peripheral circuit thereof. The processor 34 may further include another operating circuit, such as a logic-arithmetic unit or an arithmetic unit.

Figure 6:
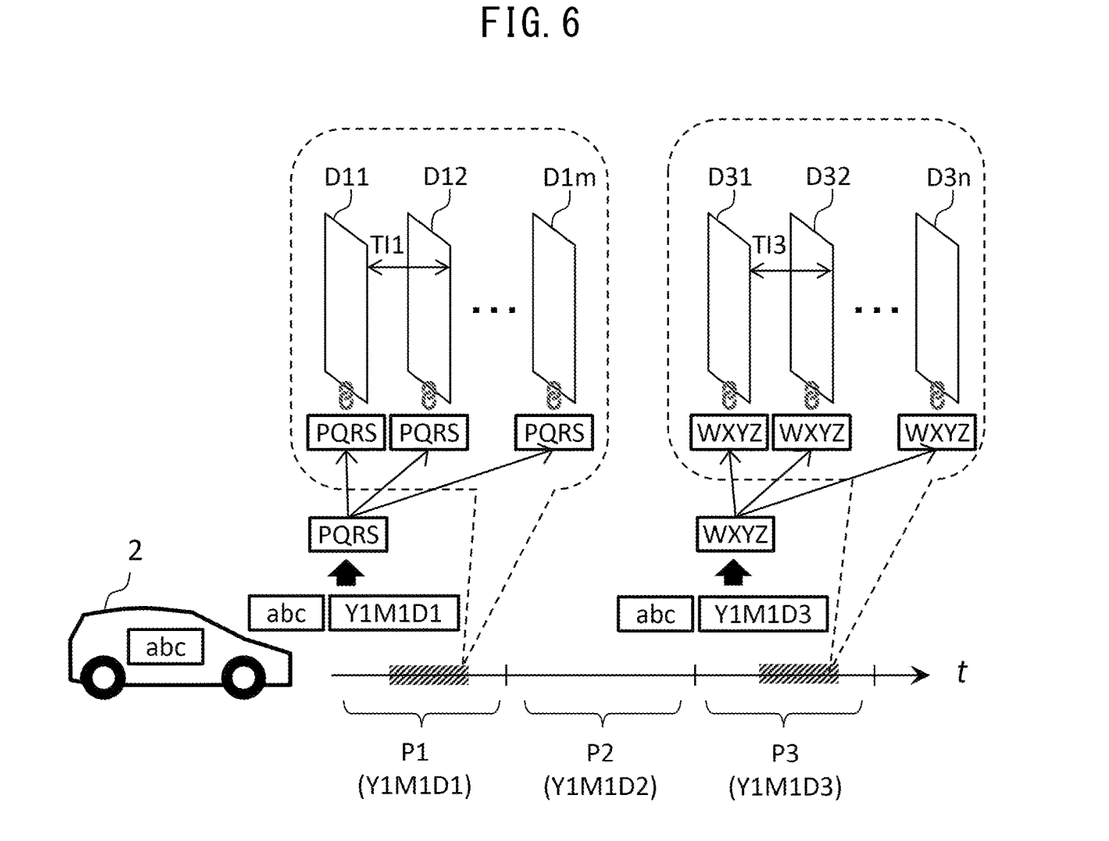
FIG. 6 is a diagram for briefly describing a data collecting process.

FIG. 6 is a diagram for briefly describing the data collecting process.

The ECU 53 obtains a number, m, of pieces D11-D1$m$ of image data representing road environment around the vehicle 2 in a first period P1. The times of generation of the first piece D11 and the second piece D12 of image data are separated by an interval TI1, and up to the last piece D1$m$ of image data, the times of generation of the respective pieces are arrayed at the same intervals. The ECU 53 also obtains a number, n, of pieces D31-D3$n$ of image data representing road environment around the vehicle 2 in a second period P3. The times of generation of the first piece D31 and the second piece D32 of image data are separated by an interval TI3, and up to the last piece D3n of image data, the times of generation of the respective pieces are arrayed at the same intervals.

The ECU 53 connects the identifier "abc" of the vehicle 2 to "Y1M1D1" corresponding to the year, month, and day of the date including the first period P1, and inputs the obtained value into a hash function to generate a first hash value "PQRS." The ECU 53 associates the generated first hash value "PQRS" with the pieces D11-D1m of image data corresponding to the first period P1. Additionally, the ECU 53 connects the identifier "abc" of the vehicle 2 to "Y1M1D3" corresponding to the year, month, and day of the date including the second period P3, and inputs the obtained value into the hash function to generate a second hash value "WXYZ." The ECU 53 associates the generated second hash value "WXYZ" with the pieces D31-D3n of image data corresponding to the second period P3. In this way, different hash values are associated with the pieces D11-D1m of image data corresponding to the first period P1 and the pieces D31-D3n of image data corresponding to the second period P3.

Figure 7:
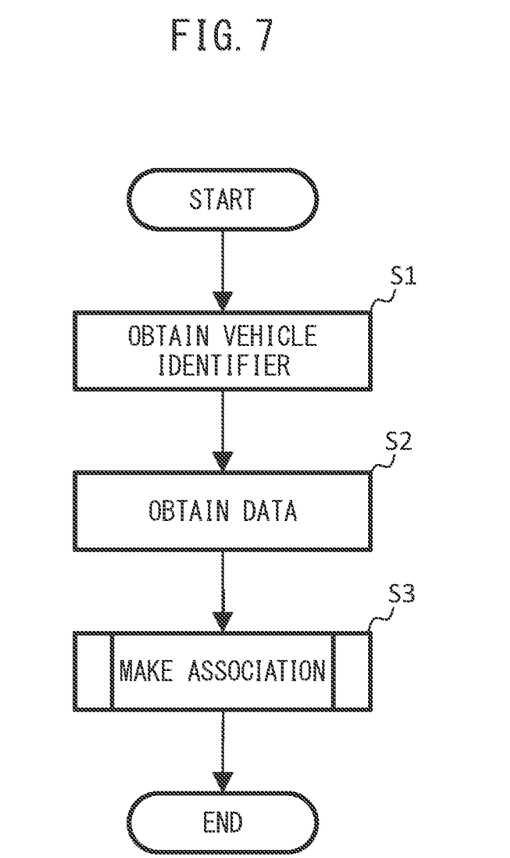
FIG. 7 is a flowchart of the data collecting process.

FIG. 7 is a flowchart of the data collecting process. The ECU 53 repeats the data collecting process illustrated in FIG. 7 at predetermined intervals.

First, the associating unit 531 of the ECU 53 obtains the vehicle identifier for identifying the vehicle 2 (step S1). Next, the associating unit 531 obtains image data representing road environment around the vehicle 2 at a predetermined time (step S2). The associating unit 531 of the ECU 53 executes an associating process to associate a hash value with the obtained image data (step S3), and then terminates the data collection process.

Figure 8:
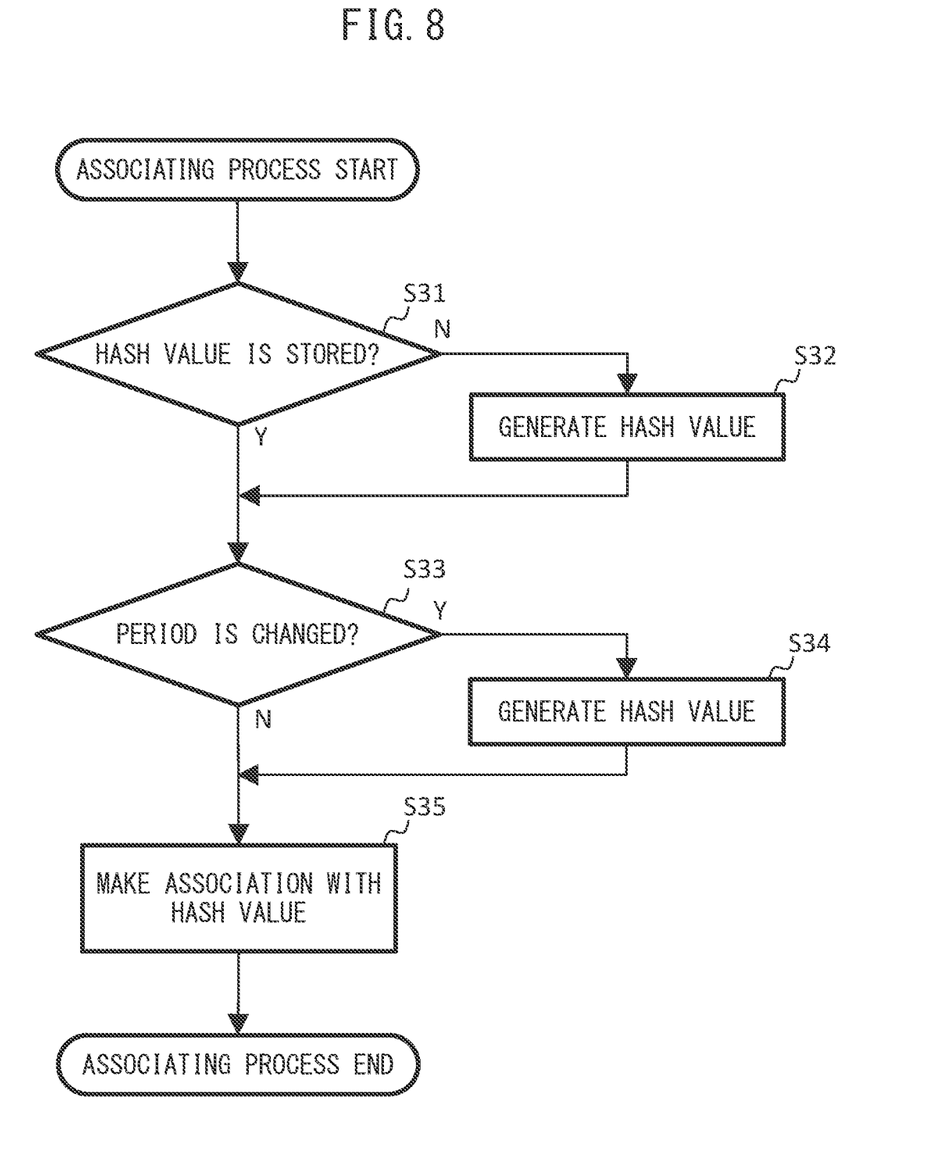
FIG. 8 is a flowchart of an associating process.

FIG. 8 is a flowchart of the associating process. Every time step S3 in the data collecting process is executed, the associating unit 531 of the ECU 53 executes the associating process illustrated in FIG. 8.

First, the associating unit 531 determines whether a hash value is stored in the memory 52 (step S31). If it is determined that a hash value is not stored in the memory 52 (No in step S31), the associating unit 531 generates a hash value using the vehicle identifier, and stores it in the memory 52 (step S32). The hash value stored in the memory 52 at determination in step S31 or the hash value generated in step S32 and stored in the memory 52 is an example of the first hash value.

Next, the associating unit 531 determines whether the period including the time of generation of the obtained image data is changed from the period including the time of generation of the previously obtained image data (step S33). If it is determined that the period is changed (Yes in step S33), the associating unit 531 generates a hash value using the vehicle identifier, and stores it in the memory 52 (step S34). The hash value generated in step S34 and stored in the memory 52 is an example of the second hash value.

The associating unit 531 associates the hash value stored in the memory 52 with the obtained image data (step S35). If it is determined that the period is not changed (No in step S33), the first hash value is used for the association in step S35. If it is determined that the period is changed (Yes in step S33), the second hash value is used for the association in step S35.

Executing the data collecting process in this way makes time-series analysis of collected data difficult. For this reason, the data collecting system 1 can collect data from a vehicle so that activities of an individual possessing the vehicle cannot be guessed.

According to a modified example, the server 3 in the data collecting system 1 may serve as the apparatus for collecting data. In this case, the ECU 25 stores in the storage device 24 image data generated by the camera 21 in association with the vehicle identifier. The ECU 25 controls the DCM 23 to transmit the image data and the vehicle identifier stored in the storage device 24 to the server 3 via the wireless base station 5 and the communication network 4. The server 3 obtains the image data and the vehicle identifier via the communication interface 31, and stores them in the storage device 32. The processor 34 of the server 3 associates, with the obtained image data, a hash value obtained by irreversibly transforming the vehicle identifier, instead of the vehicle identifier.

In the modified example, the ECU 25 may transmit the period-defining information to the server 3 together with the image data and the vehicle identifier.

Note that those skilled in the art can apply various changes, substitutions, and modifications without departing from the spirit and scope of the present disclosure.

What is claimed is:

1. An apparatus for collecting data, comprising:
a memory that stores a vehicle identifier for identifying a vehicle; and
a processor configured to associate, when a time of generation of data representing road environment around the vehicle is included in a first period, a first hash value with the data and to associate, when the time of generation is included in a second period different from the first period, a second hash value different from the first hash value with the data, the data being generated by a sensor mounted on the vehicle, the first hash value and the second hash value being obtained by irreversibly transforming the vehicle identifier.

2. The apparatus according to claim 1, wherein the data is composed of a plurality of pieces; and the processor is further configured to associate the first hash value and the second hash value with the data, using a period including a series of times separated at predetermined intervals as the first period and a period including a series of times separated at predetermined intervals and not included in the first period as the second period, the times respectively corresponding to the pieces of data.

3. The apparatus according to claim 1, wherein the processor is further configured to associate the first hash value and the second hash value with the data in the first period and the second period, respectively, that are specified by period-defining information indicating starting times or ending times of the first period and the second period.

4. The apparatus according to claim 3, wherein the period-defining information indicating starting times indicates a time when an ignition of the vehicle is turned on, and the period-defining information indicating ending times indicates a time when the ignition is turned off.

5. The apparatus according to claim 1, wherein the processor is further configured to discard the data with a predetermined probability if the vehicle is located in a predetermined geographical area at the time of generation of the data.

6. The apparatus according to claim 1, wherein the first hash value is obtained by irreversibly transforming the vehicle identifier connected with a first value, and the second hash value is obtained by irreversibly transforming the vehicle identifier connected with a second value different from the first value.

7. A method for collecting data, comprising:
   storing a vehicle identifier for identifying a vehicle in a memory; and
   associating, when a time of generation of data representing road environment around the vehicle is included in a first period, a first hash value obtained by irreversibly transforming the vehicle identifier with the data instead of the vehicle identifier; and associating, when the time of generation is included in a second period different from the first period, a second hash value obtained by irreversibly transforming the vehicle identifier with the data instead of the vehicle identifier, the data being generated by a sensor mounted on the vehicle, the second hash value being different from the first hash value.

\* \* \* \* \*